UNITED STATES PATENT OFFICE.

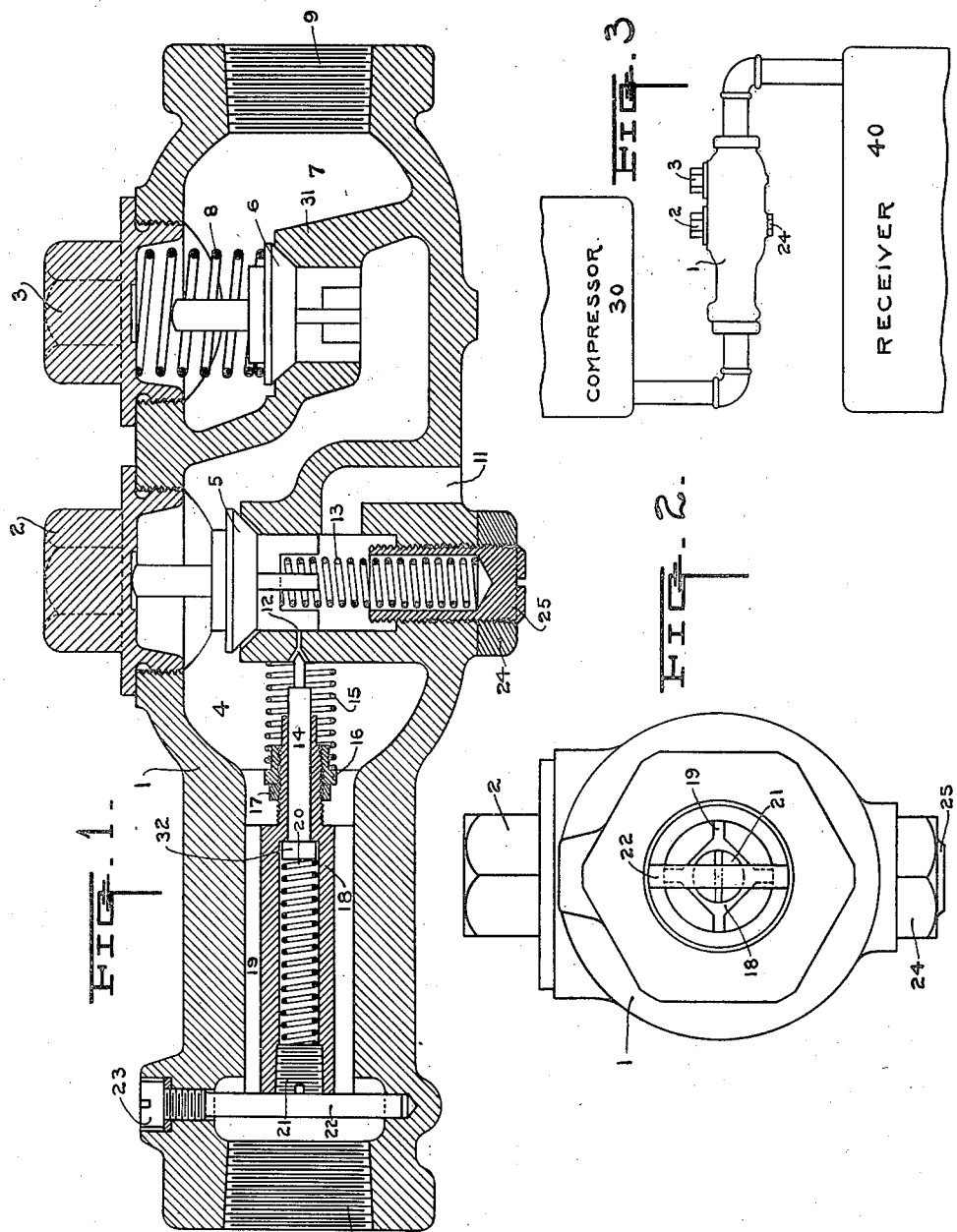

HERBERT W. CHENEY, OF MILWAUKEE, WISCONSIN, ASSIGNOR, BY MESNE ASSIGN-
MENTS, TO ALLIS-CHALMERS MANUFACTURING COMPANY, A CORPORATION OF
DELAWARE.

UNLOADING DEVICE FOR COMPRESSORS.

1,133,792.

Specification of Letters Patent.

Patented Mar. 30, 1915.

Application filed May 27, 1912. Serial No. 700,532.

*To all whom it may concern:*

Be it known that I, HERBERT W. CHENEY, a citizen of the United States, residing at Milwaukee, in the county of Milwaukee and State of Wisconsin, have invented a certain new and useful Improvement in Unloading Devices for Compressors, of which the following is a specification.

This invention relates to unloading devices for compressors, and particularly to such devices as may be applied to unload an electric motor used to drive a compressor, and especially such electric motors whose starting torque is low.

The object of the invention is to provide a simple and efficient means whereby the motor driving the compressor is allowed to attain nearly full speed before the load is thrown in. The device is entirely automatic after once being adjusted, and is designed as an improvement over the unloading device of Patent No. 995,401, June 13, 1911. In said patent there is a continuous leakage of air through the small leak-off port when the compressor is in action. This is objectionable and is entirely prevented in the present invention.

A clear conception of the invention can be had by referring to the accompanying drawing in which like reference characters designate the same part in the different views.

In the drawing,—Figure 1 is an enlarged longitudinal sectional view of the device. Fig. 2 is an end elevation, also enlarged, as viewed from the left in Fig. 1. Fig. 3 is a reduced schematic view of the device showing its relation to the compressor and to the receiver.

Referring to the drawings, especially Fig. 3, the compressor 30 is connected to the receiver 40 through the connection 1, embodying the unloading device, by means of ordinary and usual piping.

Referring more especially to Fig. 1 of the drawing, the connection 1 forms a casing having an inlet 10 and an outlet 9. A ported partition 31 separates the inlet space 4 from the outlet space 7, and the port in the partition 31 is controlled by a spring-pressed valve 6, the spring 8 of which reacts against a cap 3 screwed into the top of the casing forming the connection 1. This valve 6 therefore comprises a check valve to prevent the return of air from the receiver. In the bottom of the inlet space 4 is formed a projection which is bored through to the outside, the bore being closed by the plug 25 which is locked in place by the nut 24. The bore has a cored by-pass 11 opening to atmosphere through the bottom of the casing. At the upper end of the bore through the projection, is formed a valve seat for the valve 5 held open against the cap 2 screwed in the top of the casing forming the connection 1, by means of a spring 13 reacting within a recess in the plug 25. A small port 12 is formed in the projection connecting the inlet space 4 with the through bore formed in the projection. It will thus be seen that the inlet space 4 may be connected to atmosphere through two ports and the common by-pass 11.

The connection 1 has a necked portion between the inlet 10 and the inlet space 4, which is bored out and in which is loosely fitted a plunger 18 having four space wings 19 which guide the plunger within the bore of the necked portion. A pin 22 having a threaded shank and head 23, is screwed into the connection 1 in position to form a stop for the plunger 18 to prevent its withdrawal from the connection 1. A spring 15 acting against a nut 16 screw-threaded upon the reduced inner end of the plunger 18 and held in place thereon by lock nuts 17, tends to hold the plunger 18 in contact with the stop-pin 22. The spring 15 reacts against the projection in the bottom of the inlet space 4. It should be understood, that by the use of the term spring is included any equivalent such as gravity or air pressure means.

The plunger 18 is axially bored through and counterbored at its outer end. A valve 14 projects from the front end of the plunger and has a head 32 located within the counterbore to limit the extent of projection of the valve 14 from the plunger 18. A spring 20 lies within the counterbore of the plunger 18 and acts against the head 32 of the valve 14 while reacting against a screw plug 21 closing the outer end of the counterbore. The valve 14 coacts with the valve seat formed at the inlet space end of the port 12. It will thus be seen that there is a lost motion connection between the valve 14 and the plunger 18, the spring within which tends to hold the valve 14 in a definite position with respect to said plunger.

The operation is as follows: Assuming the compressor to be inactive, the valves 5 and 14 will be off their respective seats, the springs 13 and 15 respectively holding them in such position. The compressor being started into action, the flow of air through the necked portion of the connection 1, between the wings 19 of the plunger will at once carry the plunger to the right, referring to Fig. 1, against the increasing compression of spring 15 until the valve 14 closes off the port 12. It will even continue farther than this in its travel and compress the spring 20, leaving the valve 14 in its closing position. The air in the inlet space 4 will become compressed and will leak past valve 5 through the bore and by-pass 11 to atmosphere, thus unloading the compressor. At about the time the motor has attained full speed, the increasing pressure in inlet space 4 will close valve 5 against its spring 13 and shut off the relief port to atmosphere. The compressed air will then unseat the valve 6 in the partition 31 against its spring 8 and flow through the outlet 9 to the receiver 40.

After the receiver is under due compression the motor will be stopped in any desired manner, after which the plunger 18 will move to the left by action of spring 15 and finally unseat the valve 14. This will at once relieve the inlet space 4 through port 12, the bore and by-pass 11, after which the valve 5 also will be unseated by action of the spring 13. The device will then be ready for the next starting of the compressor.

It should be noted that the pulsations that may be present during the action of the compressor are free to vibrate the plunger 18 back and forth to some extent without disturbing the closed condition of valve 14. This is due to the lost motion spring connection between the valve 14 and the plunger 18. The same connection prevents shock during the seating of valve 14. It should also be noted that the weight of the plunger 18 constitutes a timing element that prevents the quick action, or rather the too quick action, of the valve 14, as it takes time to accelerate a heavy body such as the plunger 18.

It should be understood that it is not desired to be limited to the exact details of construction shown and described, for obvious modifications will occur to a person skilled in the art.

It is claimed and desired to secure by Letters Patent,—

1. In an unloading device for compressors, the combination of a casing having a spring-opened-valve-controlled outlet to atmosphere, a check valve controlled outlet to the receiver, a relief port to atmosphere, and a spring-opened valve controlling said relief port.

2. In an unloading device, a compressor, a receiver, a connection between said compressor and said receiver said connection having a plurality of ports connecting to atmosphere, and spring-opened valves controlling said ports.

3. In an unloading device, a compressor, a receiver, a connection between said compressor and said receiver, a spring-closed valve in said connection, said connection having between said compressor and said valve a plurality of ports connecting to atmosphere, a valve adapted to be closed by pressure in said connection for controlling one of said ports, and a valve adapted to be closed by flow of air from said compressor into said connection for controlling the other of said ports.

4. In an unloading device, a compressor, a receiver, a connection between said compressor and said receiver, a spring-closed valve in said connection, said connection having between said compressor and said valve a plurality of ports connecting to atmosphere, a second valve adapted to be closed by pressure in said connection for controlling one of said ports, a third valve controlling the other of said ports, a plunger adapted to be moved by flow of air into said connection to close said valve, and a spring between said third valve and said plunger compressible during said movement of said plunger to close said valve.

5. In an unloading device, a compressor, a receiver, a connection between said compressor and said receiver, two relief ports to atmosphere from said connection, a spring-opened valve for one of said ports closable by an excess of connection pressure over atmospheric pressure, a plunger, a valve for the other of said ports, a spring between said plunger and said second valve, said plunger being movable by an excess of compressor pressure over connection pressure to close said second valve through said spring, and a spring for returning said plunger to open said second valve.

6. In an unloading device, a compressor, a receiver, a connection between said compressor and said receiver, two relief ports to atmosphere from said connection, a spring-opened valve for one of said ports closable by an excess of connection pressure over atmospheric pressure, a plunger loosely fitting the inlet to said connection and adapted to be moved by the flow of air into said connection, a spring for returning said plunger after cessation of said flow, a valve for said second port having a lost-motion connection with said plunger, and a spring tending to hold said second valve in a definite position with respect to said plunger, said second valve closing said port during said flow.

7. In an unloading device, a compressor, a receiver, a connection between said compressor and said receiver, a valve controlling a relief port from said connection to atmosphere, means actuable to close said valve by flow of air from said compressor into said connection, spring means for opening said valve, and means for delaying the opening of said valve.

In testimony whereof, the signature of the inventor is affixed hereto in the presence of two witnesses.

HERBERT W. CHENEY.

Witnesses:
   CHAS. L. BYRON,
   G. F. DE WEIN.